United States Patent [19]
Suzuoki

[11] Patent Number: 6,119,217
[45] Date of Patent: Sep. 12, 2000

[54] INFORMATION PROCESSING APPARATUS AND INFORMATION PROCESSING METHOD

[75] Inventor: Masakazu Suzuoki, Tokyo, Japan

[73] Assignee: Sony Computer Entertainment, Inc., Japan

[21] Appl. No.: 09/048,140

[22] Filed: Mar. 25, 1998

[30] Foreign Application Priority Data

Mar. 27, 1997 [JP] Japan ..................................... 9-074931

[51] Int. Cl.[7] .............................. G06F 9/40; G06F 3/14
[52] U.S. Cl. .......................... 712/36; 712/227; 345/522; 345/327; 345/334
[58] Field of Search ................................. 712/21, 22, 36, 712/20, 43, 227; 708/210, 670; 707/104; 345/508, 501, 515, 502, 503, 327, 522; 340/825.22

[56] References Cited

U.S. PATENT DOCUMENTS 5,239,654  8/1993  Ing-Simmons et al. ................... 712/20
5,706,478  1/1998  Dye ......................................... 345/503

*Primary Examiner*—Daniel H. Pan

*Attorney, Agent, or Firm*—Fulwider Patton Lee & Utecht, LLP

[57] ABSTRACT

Priorities are assigned to a plurality of central processing units (CPUs) and the CPUs transfer their respective display lists of drawing instructions to a drawing unit on a priority basis. When a master CPU (Geometry Subsystem 0) is creating a display list (List #0-1) and a drawing unit (a rendering system) is in an idle state, a right to make an access to the drawing unit is handed over to a slave CPU (Geometry Subsystem 1), enabling the slave CPU to supply a display list (List 1-1) created thereby, if any, to the drawing unit. Receiving the display list (List #1-1), the drawing unit starts drawing processing in accordance with List #1-1. As the master CPU completes the creation of the display list (List #0-1), the slave CPU returns the right to make an access to the drawing unit to the master CPU, enabling the master CPU to supply List #0-1 to the drawing unit. Receiving the display list (List #0-1), the drawing unit starts drawing processing in accordance with List #0-1. Thereafter, when the master CPU is creating a display list and the drawing unit is in an idle state, a right to make an access to the drawing unit is handed over to the slave CPU (Geometry Subsystem 1), enabling the slave CPU to supply another display list created thereby, if any, to the drawing unit in the same way.

4 Claims, 13 Drawing Sheets

NEXT meta-instruction

REF meta-instruction

INFORMATION PROCESSING APPARATUS AND INFORMATION PROCESSING METHOD

BACKGROUND OF THE INVENTION

In general, the present invention relates to an information processing apparatus and an information processing method. More particularly, the present invention relates to an information processing apparatus and an information processing method wherein and whereby typically a plurality of CPUs generate their respective instructions concurrently and transfer the generated instructions to a drawing unit in accordance with priorities assigned to the CPUs so as to allow drawing processing to be carried out by the drawing unit with a high degree of efficiency.

With larger scales of integration of LSIs achieved in recent years, a plurality of identical circuits can be laid out in parallel in one LSI, allowing the speed of processing carried out thereby to be increased. By the way, a video game system manufactured in recent years comprises a central processing unit (CPU) and a drawing unit. Receiving data representing a polygon to be displayed from a controller, the CPU carries out 2-dimensional or 3-dimensional coordinate transformation on the data and creates a list of drawing instructions used for drawing the polygon on a 2-dimensional frame buffer. The CPU then transfers the list which is referred to hereafter as a display list to the drawing unit for drawing the polygon in accordance with the display list.

However, effects of improving the throughput of a processing system by adopting a parallel processing technique are reaped more effectively for a system wherein a number of simple operations are carried out repeatedly as is the case with the drawing unit. As a consequence, the speed of processing executed by the CPU is relatively low in comparison with a parallel processing drawing unit produced in recent years. In addition, in order to reduce the amount of 3-dimensional model data, it is necessary to generate a complex graphic such as a curved surface from few pieces of vertex data (control points) each time a drawing operation is carried out. It is the CPU that has to bear the load of processing to generate such a complex graphic. As a result, there is raised a problem that the drawing processing can not be carried out with a high degree of efficiency.

OBJECT AND SUMMARY OF THE INVENTION

Addressing the problems described above, it is an object of the present invention to provide an information processing apparatus and an information processing method that allow data to be processed with a high degree of efficiency by assigning priorities to a plurality of CPUs, letting the CPUs operate concurrently and processing display lists generated by the CPUs on a priority basis starting with a display list generated by a CPU having a highest priority.

An information processing apparatus according to claim 1 is characterized in that said apparatus comprises:

a first generation means for carrying out processing to generate a first instruction;

a second generation means for carrying out processing to generate a second instruction;

an execution means for executing said first and second instructions by switching from said first instruction to said second instruction and vice versa with predetermined timing;

a first transfer means for transferring said first instruction to said execution means; and a second transfer means for transferring said second instruction to said execution means, wherein, when said first generation means is in the course of processing and said execution means is in a wait state, said second transfer means supplies said second instruction, if any, to said execution means and, receiving said second instruction, said execution means executes said second instruction.

An information processing method according to claim 5 is characterized in that, when a first generation means is in the course of processing and an execution means is in a wait state, a second transfer means supplies a second instruction, if any, to said execution means and, receiving said second instruction, said execution means executes said second instruction.

In the information processing apparatus according to claim 1 wherein a first generation means carries out processing to generate a first instruction;

a second generation means carries out processing to generate a second instruction;

an execution means executes said first and second instructions by switching from said first instruction to said second instruction and vice versa with predetermined timing;

a first transfer means transfers said first instruction to said execution means; and a second transfer means transfers said second instruction to said execution means, when said first generation means is in the course of processing and said execution means is in a wait state, said second transfer means supplies said second instruction, if any, to said execution means and, receiving said second instruction, said execution means executes said second instruction.

With the information processing method according to claim 5, when a first generation means is in the course of processing and an execution means is in a wait state, a second transfer means supplies a second instruction, if any, to said execution means and, receiving said second instruction, said execution means executes said second instruction.

The above and other objects, features and advantages of the present invention will become more apparent from the following detailed description when taken in conjunction with the accompanying drawings which illustrate a preferred embodiment of the present invention by way of examples.

BRIEF DESCRIPTION OF THE DRAWINGS

A preferred embodiment of the present invention will be described with reference to the following diagrams wherein.

DETAILED DESCRIPTION OF THE PREFERRED EMBODIMENT

Figure 1:
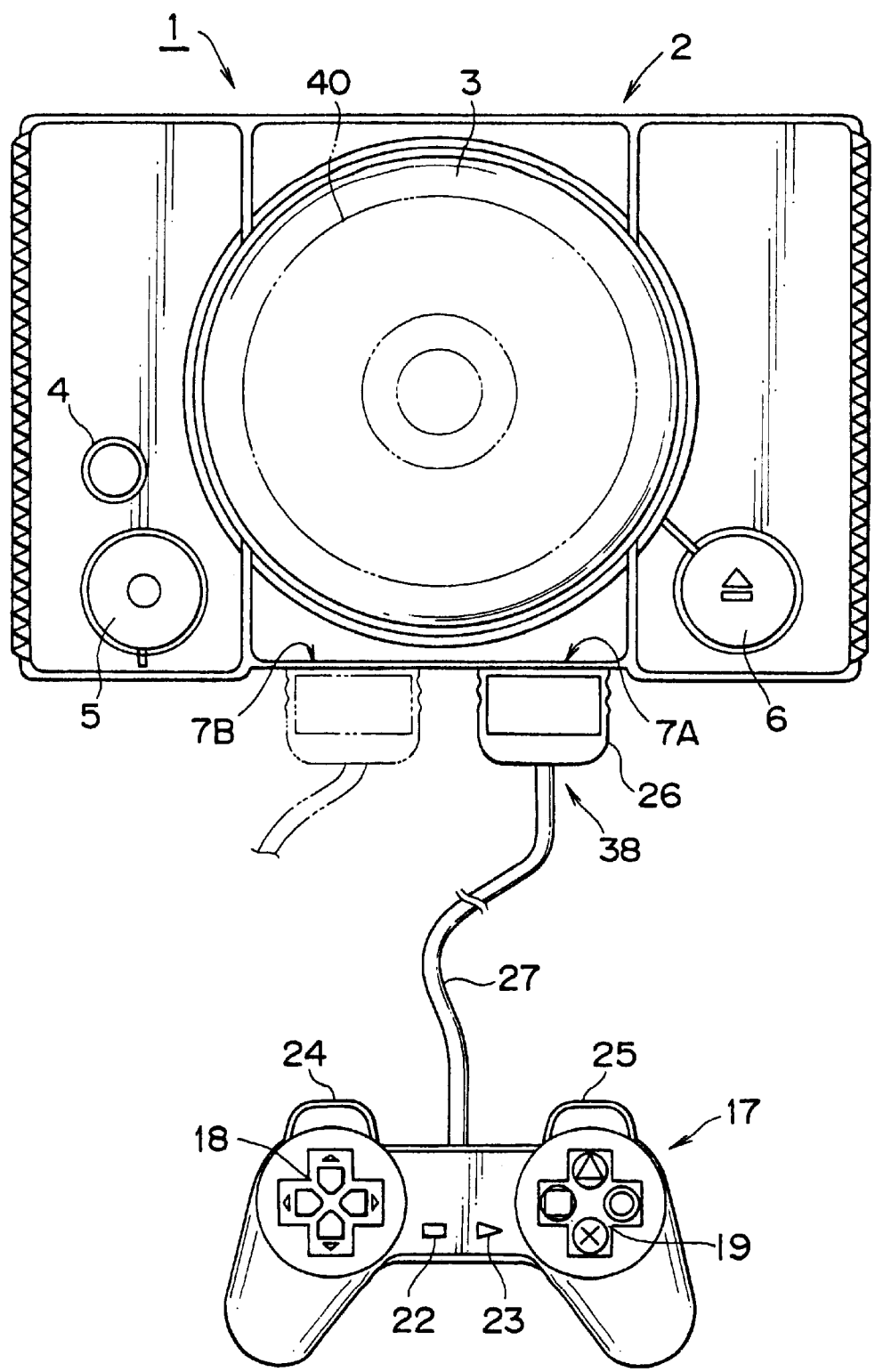
FIG. 1 is a plan diagram showing a typical home entertainment system to which an information processing apparatus provided by the present invention is applied.
Figure 2:
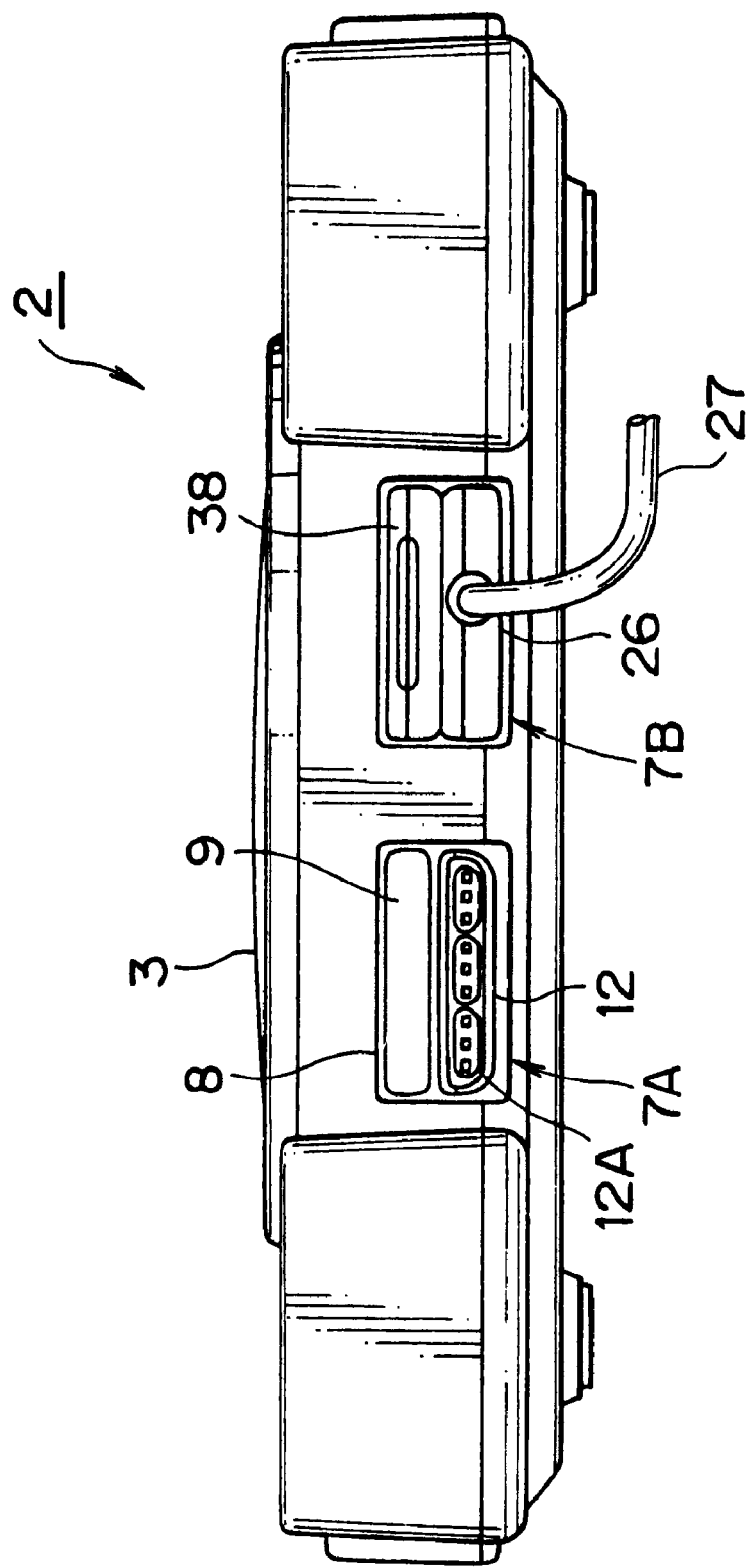
FIG. 2 is a diagram showing a front view of the home entertainment system 1 shown in FIG. 1.
Figure 3:
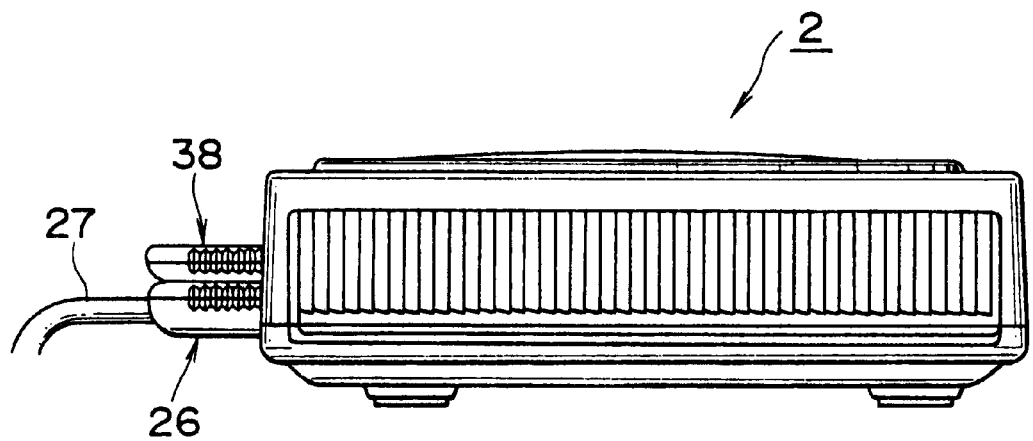
FIG. 3 is a diagram showing a side view of the home entertainment system 1 shown in FIG. 1.

FIGS. 1 to 3 are each a diagram showing a typical home entertainment system to which an information processing apparatus provided by the present invention is applied. As shown in the figures, a home entertainment system comprises an entertainment system main unit 2 in addition to an operation unit 17 and a recording unit 38 which can be connected to the entertainment system main unit 2.

Figure 4:
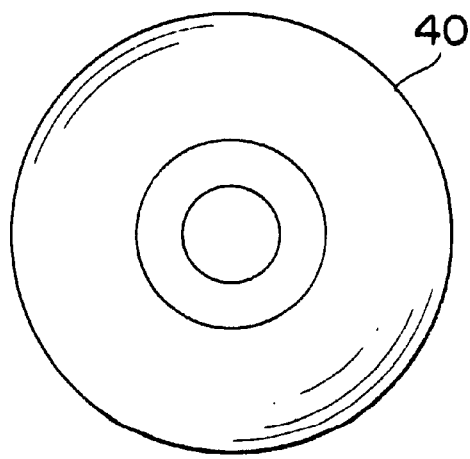
FIG. 4 is a plan diagram showing a typical CD-ROM, from which information is played back in the home entertainment system 1 shown in FIG. 1.

As shown in FIGS. 1 to 3, the entertainment system main unit 2 has an all but square shape. The entertainment system main unit 2 comprises a disc mounting sub-unit 3 for mounting a CD-ROM (compact disc read only memory) 40 located at the center thereof, a reset switch 4 located at a proper position on the entertainment system main unit 2 for use by the user to arbitrarily resetting a running application, a power supply switch 5 for use by the user to turn on and off a power supply, a disc operation switch 6 for use by the user to mount a disc on the disc mounting sub-unit 3 and connectors 7A and 7B on the right and left respectively for use by the user to connect the entertainment system main unit 2 to the operation unit 17 which is used for carrying out operations while an application is running and the recording unit 38 for recording the setting various kinds of information of the running application and the like. It should be noted that the CD-ROM is a kind of optical disc like one shown in FIG. 4. The CD-ROM is a disc used as a recording medium of a running application.

As shown in FIGS. 2 and 3, the connectors 7A and 7B are each designed into two levels. At the upper level of each of the connectors 7A and 7B, a recording insert portion 8 for connecting the entertainment system main unit 2 to the recording unit 38 is provided. At the lower level of each of the connectors 7A and 7B, on the other hand, a connector pin insert portion 12 for connecting the entertainment system main unit 2 to the operation unit 17 is provided.

The recording insert portion 8 comprises a horizontal long rectangular insert hole and a memory terminal into which the recording unit 38 is inserted. The memory terminal is placed inside the hole and not shown in the figure. With the recording unit 38 not connected to the entertainment system main unit 2, the recording insert portion 8 is covered by a shutter 9 for protecting the memory terminal against dust and the like as shown in FIG. 2. It should be noted that the recording unit 38 has an electrically programmable ROM into which the main CPU 44 records data of application software.

When mounting the recording unit 38 on the entertainment system main unit 2, the user pushes the shutter 9 toward the inside of the recording insert portion 8 by using the end of the recording unit 38, further inserting the recording unit 38 into the insert hole till the recording unit 38 gets connected with the memory terminal.

As shown in FIG. 2, the connector pin insert portion 12 comprises a horizontal long rectangular insert hole and a connector terminal 12A for connecting the connector insert portion 12 to a connector terminal portion 26 of the operation unit 17.

As shown in FIG. 1, the operation unit 17 has a structure that can be held and sandwiched by both the hands of the user and can be operated by free movements of the five fingers of each hand. The operation unit 17 comprises operation sub-units 18 and 19 located symmetrically on the right and left sides, a select switch 22 and a start switch 23 located between the operation sub-units 18 and 19, operation sub-units 24 and 25 located in front of the operation sub-units 18 and 19 respectively and a connector 26 and a cable 27 for connecting the operation unit 17 to the entertainment system main unit 2.

Figure 5:
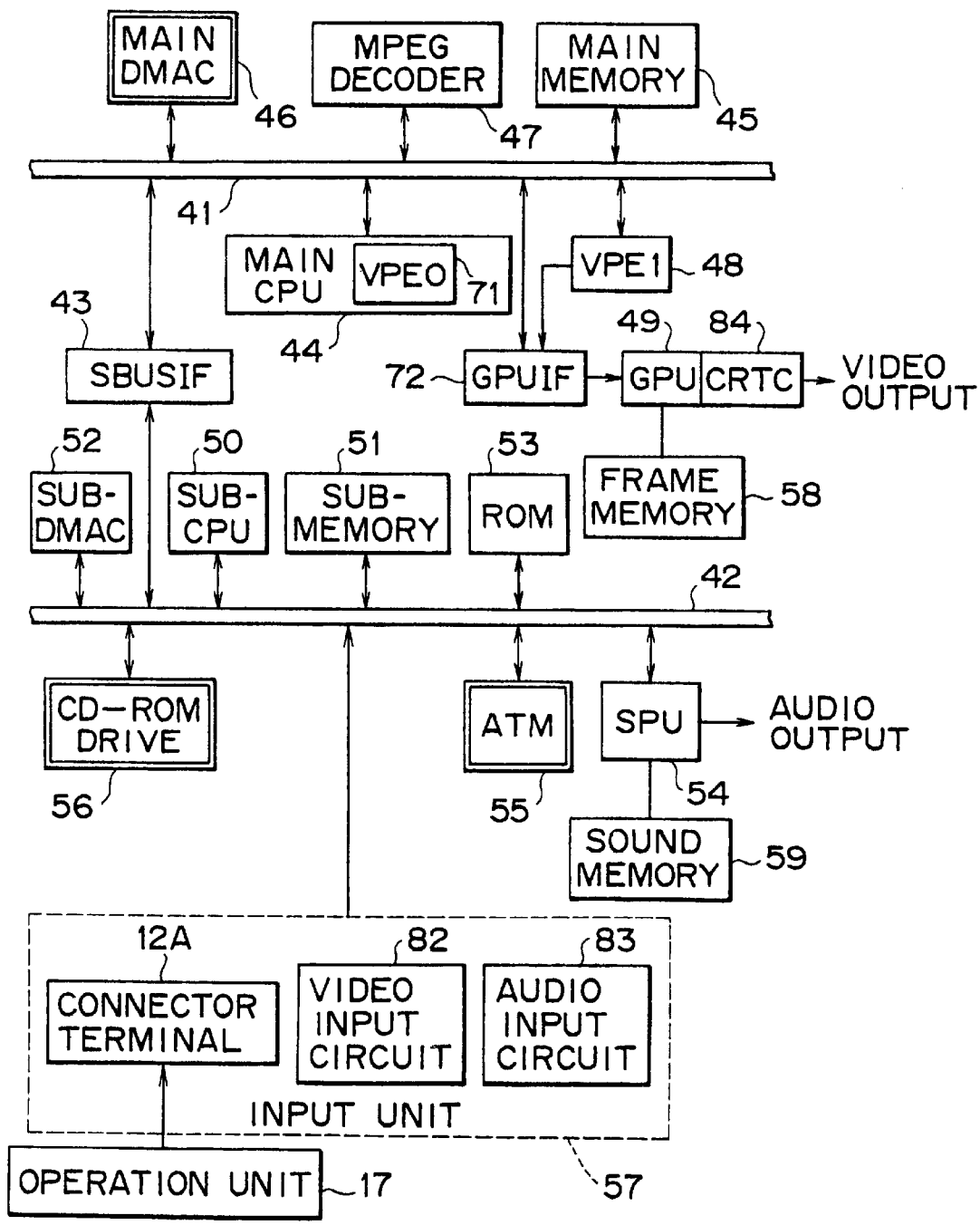
FIG. 5 is a block diagram showing a typical internal electrical configuration of the home entertainment system 1 shown in FIG. 1.

FIG. 5 is a diagram showing a typical internal electrical configuration of the entertainment system main unit 2. As shown in the figure, the entertainment system main unit 2 has a main bus 41 and a sub-bus 42 which are connected to each other by a sub-bus interface (SBUSIF) 43.

Connected to the main bus 41 are a main CPU (central processing unit) 44 (a list generating means) implemented by components such as a microprocessor and a VPE0 (a first vector processing engine) 71, a main memory 45 implemented by a RAM (random access memory), a main DMAC (main direct memory access controller) 46 (a data transferring means), an MDEC (MPEG (Moving Picture Experts Group) decoder) 47, a VPE1 (a second vector processing engine) 48. In addition, a GPU (graphical processing unit) 49 is also connected to the main bus 41 through a GPUIF (graphical processing unit interface) 72. A CRTC (CRT controller) 84 is provided on the GPU 49. In addition, a frame memory 58 is connected to the GPU 49.

On the other hand, connected to the sub-bus 42 are a sub-CPU 50 implemented by components such as a microprocessor, a sub-memory 51 implemented by a RAM, a sub-DMAC 52, a ROM 53 for storing programs such as an operating system, an SPU (sound processing unit) 54, a communication control unit (ATM) 55, a CD-ROM drive 56 serving also as the disc mounting sub-unit 3 cited earlier and an input unit 57. The connector terminal 12A of the input unit 57 is connected to the connector terminal portion 26 of the operation unit 17 as described earlier.

Connected to both the main bus 41 and the sub-bus 42, the SBUSIF 43 passes on data coming from the main bus 41 to the sub-bus 42 and, in the contrary, forwards data coming from the sub-bus 42 to the main bus 41.

When the entertainment system main unit 2 is activated, the main CPU 44 fetches out instructions of an activation program from the ROM 53 connected to the sub-bus 42 by way of the SBUSIF 43, executing the instructions of the activation program in order to activate the operating system.

In addition, the main CPU 44 issues a request to read data to the CD-ROM drive 56 in order to acquire data and an application program from the CD-ROM 40 mounted on the CD-ROM drive 56, loading the application program into the main memory 45.

Furthermore, in conjunction with the first vector processing engine (VPE0) 71, the main CPU 44 generates data for non-type processing, that is, polygon definition information, from data of a 3-dimensional object comprising a plurality of basic figures such as polygons read out from the CD-ROM 40. An example of the data of a 3-dimensional object is coordinate values of vertices or representative points of a polygon. The VPE0 (the first vector processing engine) 71 has a plurality of processing elements for processing floating point real numbers and is thus capable of carrying out pieces of floating point processing in parallel.

To put it in detail, the main CPU 44 and the VPE0 (the first vector processing engine) 71 carry out geometry processing that entails detailed operations in polygon units. An example of such processing is generation of data of a polygon which represents a swinging state of a leaf of a tree blown by a wind or a state of drops of rain hitting the front window of a car. Then, vertex information found from the processing and polygon definition information such as shading mode information are supplied to the main memory 45 as packets by way of the main bus 41.

The polygon definition information comprises drawing area setting information and polygon information. The drawing area setting information includes offset coordinates in the frame memory 58 of a drawing area, that is, a frame memory address of the drawing area, and coordinates of a drawing clipping area for canceling an operation to draw a drawing range indicated by a polygon with coordinates thereof existing outside the drawing area. On the other hand, the polygon information includes polygon attribute information and vertex information. Here, the polygon attribute information is information used for specifying a shading mode, an ALPHA blending mode and a texture mapping mode. On the other hand, the vertex information is information on coordinates in a vertex drawing area, coordinates in a vertex texture area and the color of a vertex, to mention a few.

Much like the first processing engine (VPE0) 71, the second vector processing engine (VPE1) 48 has a plurality of processing elements for processing floating point real numbers and is thus capable of carrying out pieces of floating point processing in parallel. The VPE1 48 is capable of generating an image in accordance with operations carried out by using the operation unit 17 and matrix operations. That is to say, the second vector processing engine (VPE1) 48 generates data (polygon definition information) for type processing, that is, for processing that is relatively simple enough to be carried out by execution of a program on the VPE1 48. Examples of such processing which is carried out by the second vector processing engine (VPE1) 48 are radios copy conversion for an object having a simple shape such as a building or a car, parallel light source calculation and generation of a 2-dimensional curved surface. Then, the polygon definition information generated by the VPE1 48 is supplied to the GPUIF 72.

Controlled by the main CPU 44, the GPUIF 72 also receives polygon definition information from the main memory 45 through the main bus 41. For this reason, the GPUIF 72 adjusts processing timing so as to prevent the polygon definition information originated by the main CPU 44 from colliding with the polygon definition information supplied thereto by the second vector processing engine 48, passing on them to the GPU 49.

The GPU 49 draws an image expressing a 3-dimensional object using a polygon based on the polygon definition information supplied thereto by way of the GPUIF 72 on the frame memory 58. An image drawn using a polygon for expressing a 3-dimensional object is referred to hereafter as a polygon image. Since the GPU 49 is capable of using the frame memory 58 also as a texture memory, the GPU 49 can carry out texture mapping processing to stick a pixel image in the frame memory 58 on a polygon as a texture.

The main DMAC 46 is used for controlling, among other operations, DMA transfers to and from a variety of circuits connected to the main bus 41. In addition, depending on the state of the SBUSIF 43, the main DMAC 46 is also capable of controlling, among other operations, DMA transfers to and from a variety of circuits connected to the sub-bus 42. The MDEC 47 operates concurrently with the main CPU 44, decompressing data which has been compressed in accordance with an MPEG (Moving Picture Experts Group) system or a JPEG (Joint Photographic Experts Group).

The sub-CPU 50 carries out various kinds of processing by execution of programs stored in the ROM 53. The sub-DMAC 52 controls, among other operations, DMA transfers to and from a variety of circuits connected to the sub-bus 42 only when the SBUSIF 43 is disconnected from the main bus 41 and the sub-bus 42.

The SPU 54 reads out sound data from a sound memory 59, outputting the sound data as an audio signal in accordance with a sound command received from the sub-CPU 50 or the sub-DMAC 52. The output audio signal is then supplied to a speaker 202 by way of an amplifier circuit 201 to be finally output by the speaker 202 as sound.

The communication control unit (ATM) 55 is connected to a public communication line or the like and used for transmitting and receiving data through the line.

The input unit 57 comprises the connector terminal 12A for connecting the operation unit 17 to the entertainment system main unit 2, a video input circuit 82 for supplying video data coming from other apparatuses not shown in the figure to the entertainment system main unit 2 and an audio input circuit 83 for supplying audio data coming from the other apparatuses to the entertainment system main unit 2.

Figure 6:
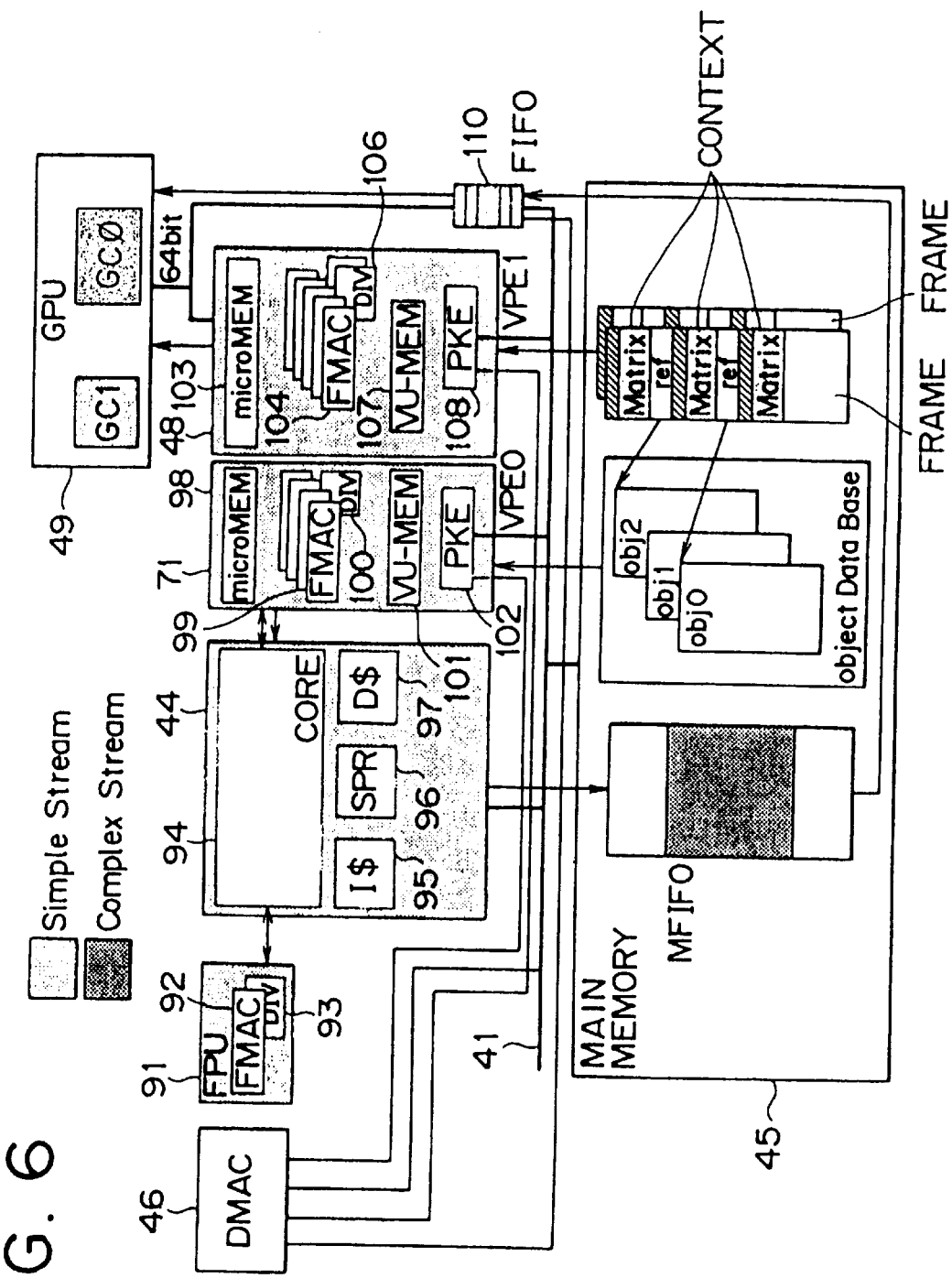
FIG. 6 is a block diagram showing a detailed configuration of a main DMAC 46, a main CPU 44, the main memory 45, a second vector processing engine (VPE1) 48 and a GPU 49 shown in FIG. 5.

FIG. 6 is a block diagram showing a detailed configuration of the main DMAC 46, the main CPU 44, the main memory 45, the second vector processing engine (VPE1) 48 and the GPU 49 shown in FIG. 5.

As shown in FIG. 6, the main CPU 44 comprises a CPU core (CORE) 94, an instruction cache (I$) 95, a scratch pad RAM (SPR) 96, a data cache (D$) 97 and the first vector processing engine (VPE0) 71. The CPU core 94 executes predetermined instructions. The instruction cache 95 is used for temporarily storing instructions to be supplied to the CPU core 94. The scratch pad RAM 96 is used for storing results of processing carried out by the CPU core 94. Finally, the data cache 97 is used for temporarily storing data to be used in the execution of processing by the CPU core 94.

The first vector processing engine (VPE0) 71 comprises a micromemory (microMEM) 98, an FMAC (Floating Multiple Adder Calculation) unit 99, a divider (DIV) 100, a functional unit 101 referred to as a VU-MEM and a packet expander (PKE) 102. The VU-MEM 101 includes a floating point vector processor unit (VU) and an embedded memory (MEM). The floating point vector processor unit executes 64-bit micro instructions of a microprogram stored in the micromemory 98 to be described more later in order to process data stored in internal registers of the VU and the embedded memory.

The PKE 102 expands microcode supplied thereto in accordance with control executed by a main DMAC 109 to be described more later into microinstructions to be stored as a microprogram in the micromemory 98 and to be executed by the VU, and expands a packet of packed data also supplied thereto in accordance with the control executed by the main DMAC 109, storing the expanded packet into the embedded memory (MEM) employed in the VU-MEM 101. The FMAC (Floating Multiple Adder Calculation) unit 99 executes floating point processing whereas the divider (DIV) 100 carries out division. As described above, the first vector processing engine (VPE0) 71 is embedded in the main CPU 44 which carries out non-type processing in conjunction with the VPE0 71.

Much like the first vector processing engine (VPE0) 71, the second vector processing engine (VPE1) 48 comprises a micromemory (microMEM) 103, an FMAC (Floating Multiple Adder Calculation) unit 104, a divisor (DIV) 106, a functional unit 107 referred to as a VU-MEM and a packet expander (PKE) 108. The VU-MEM 107 includes a floating point vector processor unit (VU) and an embedded memory (MEM). The floating point vector processor unit executes 64-bit micro instructions of a microprogram stored in the micromemory (microMEM) 103 to be described more later in order to process data stored in internal registers of the VU and the embedded memory.

The PKE 108 expands microcode supplied thereto in accordance with control executed by the main DMAC 46 into microinstructions to be stored as a microprogram in the micromemory 103 and to be executed by the VU, and expands a packet of packed data also supplied thereto in accordance with the control executed by the main DMAC 46, storing the expanded packet into the embedded memory (MEM) employed in the VU-MEM 107. The FMAC (Floating Multiple Adder Calculation) unit 104 executes floating point processing whereas the divider (DIV) 106 carries out division. The second vector processing engine 48 carries out type processing on data supplied thereto from the main memory 45 and supplies results of the processing to the GPUIF 72 by way of the GPU 49.

The main memory 45 is used for storing data of a 3-dimensional object and, when necessary, supplies the data to the first vector processing engine 71 and the second vector processing engine 48. A display list created jointly by the main CPU 44 and the first vector processing engine (VPE0) 71 is stored temporarily in a Memory FIFO (MFIFO) embedded in the main memory 45 before being supplied to the GPUIF 72 by way of the main bus 41. The reason why the display list is stored temporarily in the memory FIFO is that the main CPU 44 and the first vector processing engine 71 each have a processing priority lower than that of the second vector processing engine 48, making it necessary to keep the display list in the memory FIFO till the second vector processing engine 48 enters an idle state.

In addition, the main CPU 44 and the first vector processing engine (VPE0) 71 jointly creates a matrix to be processed by the second vector processing engine 48, storing the matrix in the main memory 45. Then, the second vector processing engine 48 makes a display list by using the matrix.

In order to process a display list for non-type processing supplied from the first vector processing engine 71 by way of the GPUIF 72 and a display list for type processing supplied from the second vector processing engine 48, the GPU 49 holds a graphic context (that is, a drawing setting condition) of, among other things, a drawing offset and a clip range to be referred to at a drawing time for each of the display lists. A notation CG0 used in the following description denotes a graphic context for non-type processing while a notation CG1 denotes a graphic context for type processing as will be described more later.

For example, as described above, the PKE 102 expands microcode supplied to the first vector processing engine 71 from the main memory 45 by way of the main bus 41 in accordance with control executed by the DMAC 109 into microinstructions to be stored as a microprogram in the micromemory 98 and to be executed by the VU, and expands a packet of packed data such as data of a 3-dimensional object also supplied thereto from the main memory 45 by way of the main bus 41 in accordance with the control executed by the DMAC 109, storing the expanded packet into the embedded memory (MEM) employed in the VU-MEM 101. Then, the FMAC 99 and the DIV 100 carry out pieces of processing such as matrix processing, transformation of coordinates and radios copy conversion on the data of the 3-dimensional object. At that time, complex processing is also performed in conjunction with the CPU core 94. The processing typically results in a display list for drawing a swinging state of a leaf of a tree blown by a wind or a state of drops of rain hitting the front window of a car.

A display list (complex stream) for drawing a 2-dimensional object created in this way on a screen is stored temporarily in the MFIFO of the main memory 45 through the main bus 41 before being supplied finally to the GPUIF 72.

On the other hand, as described above, the PKE 108 expands microcode supplied to the second vector processing engine 48 from the main memory 45 by way of the main bus 41 in accordance with control executed by the main DMAC 46 into microinstructions to be stored as a microprogram in the micromemory 103 and to be executed by the VU, and expands a packet of packed data such as data of a 3-dimensional object also supplied thereto from the main memory 45 by way of the main bus 41 in accordance with the control executed by the main DMAC 46, storing the expanded packet into the embedded memory (MEM) employed in the VU-MEM 107. Then, the FMAC 104 and the DIV 106 carry out pieces of processing such as matrix processing, transformation of coordinates and radios copy conversion on the data of the 3-dimensional object. Based on a matrix and a graphic context created jointly by the main CPU 44 and the first vector processing engine 71 and supplied to the second vector processing engine 48 from the main memory 45 by way of the main bus 41, the processing is relatively simple type processing.

A display list (simple stream) for drawing a 2-dimensional object created in this way on a screen is supplied finally to the GPUIF 72 by way of the main bus 41. The two streams, that is, the complex and simple streams, are then transferred to the GPU 49 on a time division basis by arbitration.

The GPU 49 executes drawing processing based on the display lists supplied thereto by the GPUIF 72, drawing polygons on the frame memory 58. If the display list is a display list created jointly by the main CPU 44 and the first vector processing engine 71 on the main memory unit 45 and then supplied to the GPU 49 by way of the main bus 41, the GPU 49 executes the drawing processing by using the graphic context GC0 cited earlier. If the display list is a display list created by the second vector processing engine 48, on the other hand, the GPU 49 executes the drawing processing by using the graphic context GC1 cited before.

A polygon drawn on the frame memory 58 is converted into an output video signal for the polygon in accordance with control executed by the CRTC 84.

Figure 7:
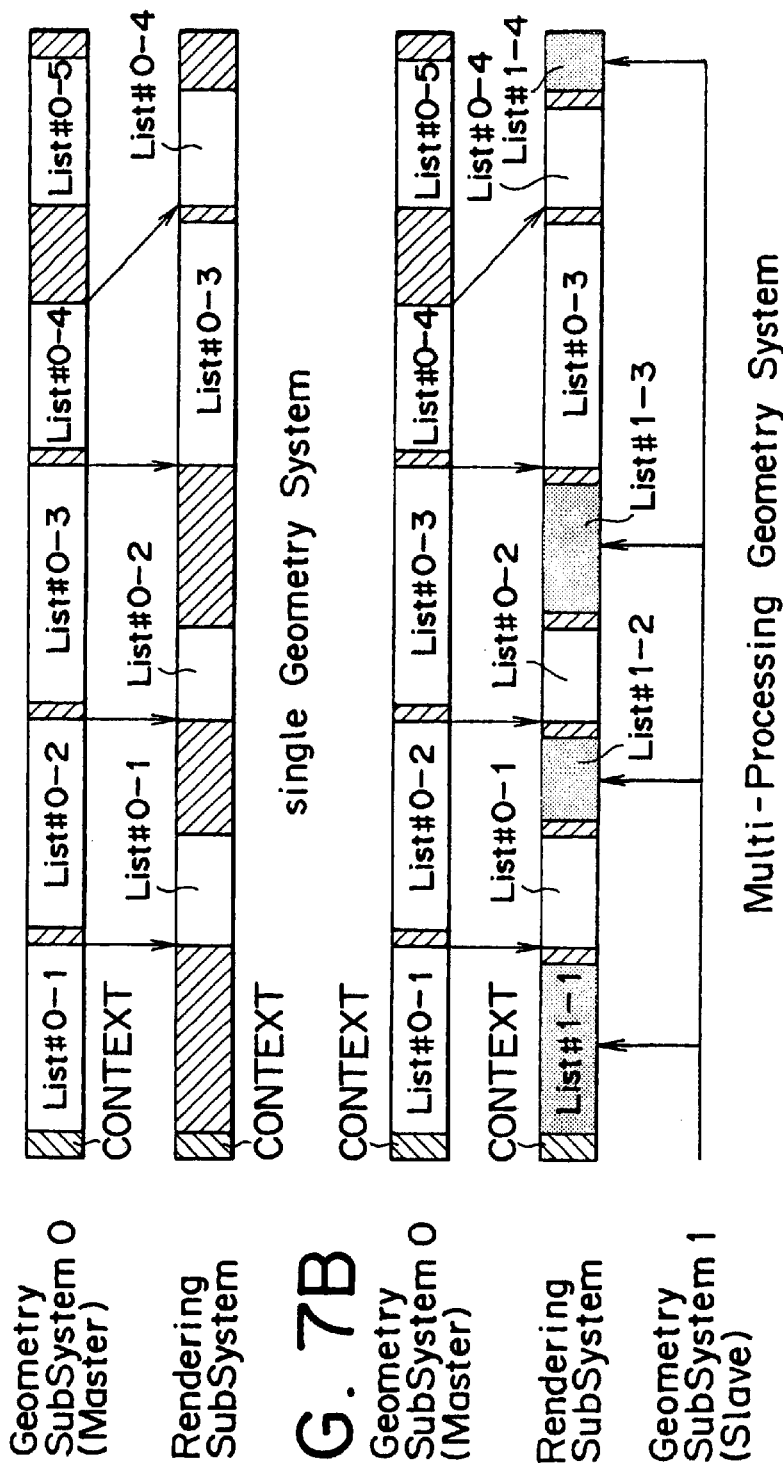
FIGS. 7A,B are diagrams showing a procedure for processing display lists generated by a plurality of processors.

FIG. 7 is a diagram showing timing with which the two display lists are processed. Geometry Subsystem 0 shown in FIG. 7 corresponds to the second vector processing engine 48 shown in FIG. 6 whereas Geometry Subsystem 1 corresponds to the main CPU 44 and the first vector processing engine 71. A rendering subsystem corresponds to the GPU 49. It should be noted that a hatched portion shown in the figure indicates that a task indicated by a task name is in an idle state.

FIG. 7A is a diagram showing a processing procedure for a case in which only one processor, that is, Geometry Subsystem 0, exists. In this case, Geometry Subsystem 0 makes a display list (List #0-1), supplying the list to the rendering system. Then, Geometry Subsystem 0 continues making display lists following List #0-1, that is, List #0-2 and subsequent display lists. The rendering system executes drawing processing in accordance with the display list (List #0-1) supplied thereto from Geometry Subsystem 0. If Geometry Subsystem 0 is still making the next display list (List #0-2) at the point of time the rendering subsystem completes the drawing processing in accordance with List #0-1, the rendering subsystem enters an idle state, waiting for Geometry Subsystem 0 to complete the creation of the next display list (List #0-2) and supply the list to the rendering subsystem.

Thereafter, much like what has been described above, if Geometry Subsystem 0 has not completed the processing of making a next display list yet at a point of time the rendering subsystem completes the drawing processing in accordance with the current display list, the rendering subsystem enters an idle state, waiting for Geometry Subsystem 0 to supply the next list to the rendering subsystem.

FIG. 7B is a diagram showing a processing procedure for a case in which two processors, that is Geometry Subsystem 0 and Geometry Subsystem 1, exist. In this case, while Geometry Subsystem 0 is making a display list (List #0-1), the rendering subsystem would be put in an idle state. For this reason, data associated with a display list (List #1-1) already created by Geometry Subsystem 1 and stored in the main memory 45 is supplied to the rendering subsystem. Receiving the first display list (List #1-1) created by Geometry Subsystem 1, the rendering subsystem executes drawing processing based on a graphic context for Geometry Subsystem 1 appended to the first display list (List #1-1) supplied to the rendering system by Geometry Subsystem 1.

When Geometry Subsystem 0 completes the processing to create the first display list (List #0-1), Geometry Subsystem 1 is supplying a next display list (List #1-2) to the rendering system. At that time, Geometry Subsystem 1 is forced to halt the operation to supply the next display list (List #1-2) to the rendering subsystem. Thus, Geometry Subsystem 0 can now supply the completed the first display list (List #0-1) to the rendering subsystem and start to make the next display list (List #0-2). Receiving the first display list (List #0-1) from Geometry Subsystem 0, the rendering subsystem carries out drawing processing based on the first display list (List #0-1).

When the rendering subsystem completes the drawing processing based on the first display list (List #0-1), Geometry Subsystem 0 is still making the next display list (List #0-2). For this reason, Geometry Subsystem 1 resumes the suspended operation to supply the next display list (List #1-2) to the rendering subsystem. Otherwise, the rendering subsystem would enter an idle state. Receiving the next display list (List #1-2) created by Geometry Subsystem 1, the rendering subsystem starts execution of drawing processing based on the next display list (List #1-2).

Thereafter, much like what has been described above, Geometry Subsystem 1 supplies a display list created thereby only when Geometry Subsystem 0 is still making a display list, putting the rendering subsystem in an idle state. As a result, display lists made by a plurality of processors can be efficiently processed by the rendering subsystem.

In order to execute the coordinate transformation processing faster, for example, a subprocessor or a coordinate transformation coprocessor can be provided separately from the CPU (the VU mentioned earlier) in each of a plurality of vector processing engines which share a common drawing unit, that is, the GPU 49, and each output display lists to the GPU 49. By employing such a subprocessor or a coprocessor, the CPU (processor) in each vector processing engine is now capable of supplying display lists more frequently to the shared GPU 49. Thus, the GPU 49 has to be switched from one processor to another at short time intervals. Otherwise, an overflow will occur in a local memory provided for each processor. For this reason, a priority level is assigned to each processor, that is, to Geometry Subsystem 0 and Geometry Subsystem 1, as shown in FIG. 7B. When there is no more display list to be transferred to the GPU 49 from a master processor, that is, a CPU having the highest priority or the CPU employed in the second vector processing engine 48 in the case of the information processing apparatus shown in FIG. 6 or Geometry Subsystem 0 shown in FIG. 7, the right to make an access to the GPU 49 is handed over to a slave processor, that is, a CPU having a priority second to the master CPU 44 or the CPU (the VU) employed in the first vector processing engine 71 in the case of the information processing apparatus shown in FIG. 6 or Geometry Subsystem 1 shown in FIG. 7.

As soon as the master processor completes the processing of making a display list and gets prepared for transferring the display list to the GPU 49, the slave processor is forced to return the right to access the GPU 49 to the master processor even if a display list still remains to be completed and transferred by the slave processor to the GPU 49.

In general, the master processor is capable of carrying out processing at a high speed but has a local memory with a relatively small storage capacity. On the other hand, a slave processor carries out processing at a relatively low speed but has a local memory with a relatively large storage capacity.

Figure 8:
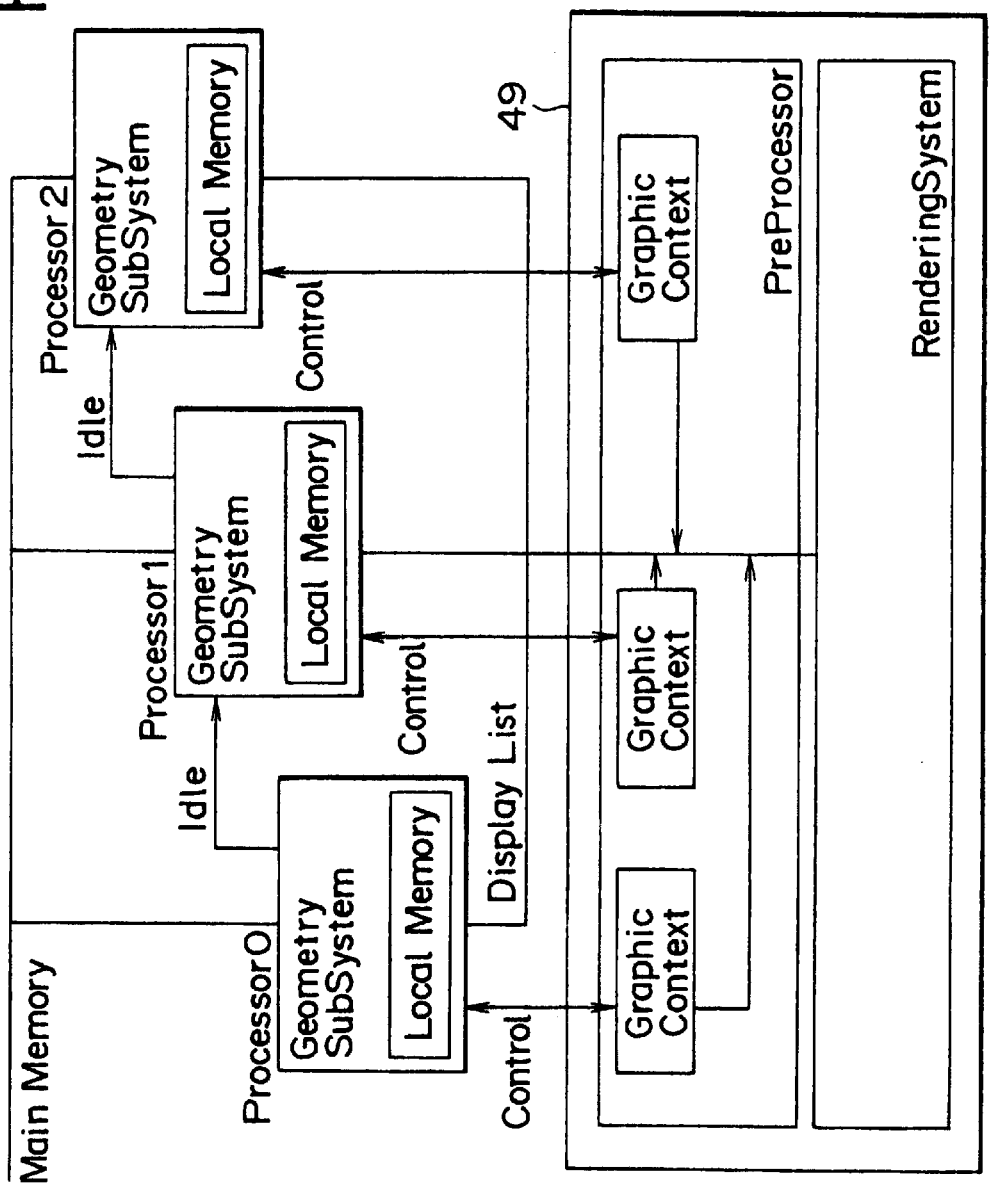
FIG. 8 is a block diagram showing another typical configuration of the home entertainment system 1 in which 3 processors control the GPU 49.

There is also an information processing apparatus in which a processor 2 serving as a slave to a slave processor 1 is further connected as shown in FIG. 8. In such an information processing apparatus, a processor with a specially low priority needs a local memory with an even greater storage capacity for storing more display lists. For this reason, a low priority is normally assigned to a main processor which is provided with a main memory. In this way, the main processor also serves as a slave processor as well.

In drawing processing carried out by the GPU 49, in addition to vertex information described in a display list, environment parameters or drawing setting conditions referred to as a graphic context such as a drawing offset and a clip range at a drawing time are also required as described above. The rendering subsystem (that is, the GPU 49) carries out drawing processing based on display lists supplied by each Geometry Subsystem (that is, the CPU) in accordance with a graphic context for the Geometry Subsystem. When the display list supplier is switched from one Geometry Subsystem to another, however, a lot amount of work to newly set a graphic context needs to be done. In order to solve this problem, the rendering subsystem holds as many graphic contexts as Geometry Subsystems.

A graphic context is added to a display list as shown in FIG. 7 typically for each object supplied to the GPU 49 to be drawn thereby. As a result, the GPU 49 is capable of carrying drawing processing for each object on the basis of a graphic context associated with the object.

Geometry Subsystems and the rendering subsystem share the main bus 41 which comprises a data bus and an address bus. A Geometry Subsystem that is accessing the rendering subsystem transmits the ID of the Geometry Subsystem and a display list created by the Geometry Subsystem to the rendering subsystem through the address bus and the data bus respectively. Receiving the ID and the display list, the rendering subsystem selects a graphic context corresponding to the ID and interprets the display list on the basis of the graphic context. The rendering subsystem then draws an image on the frame buffer.

By letting a plurality of processors (vector processing engines or Geometry Subsystems) control a GPU 49 (rendering subsystem) on a priority basis as described above, the storage capacity of a local memory provided in each of the processors for temporarily storing a display list made in the processor can be reduced to a minimum. As a result, it is possible to carry out processing to make display lists in parallel in the processors without increasing the cost of local memories. In addition, by holding a graphic context for each of the processors in the GPU 49 (the rendering subsystem), the number of duplicated data transfers, that is, the amount of overhead work, to be carried out during context switching can be reduced.

Strictly speaking, the processors share the data bus and, hence, the main memory on a time sharing basis. The following is description of a technique of controlling data in accordance with a meta-instruction embedded in the data itself during a transfer of the data to the GPU 49.

Figure 9:
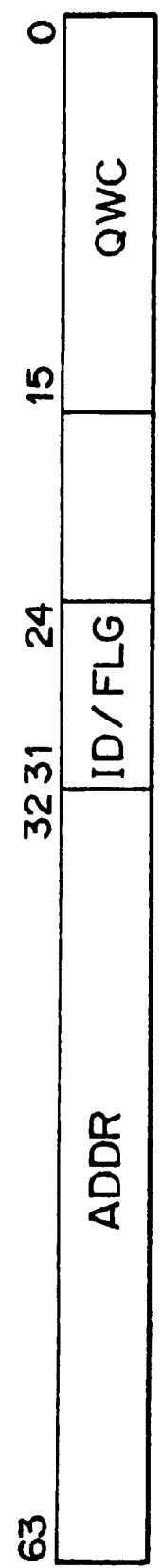
FIG. 9 is a diagram showing a typical format of a meta-instruction.

FIG. 9 is a diagram showing a typical format of a meta-instruction. A meta-instruction is an instruction added in front of data to be transferred. A meta-instruction prescribes the length of the transferred data, a destination of the data transfer and the operation code of the meta-instruction. A meta-instruction comprises 128 bits, only 64 bits of them shown in the figure are valid. The size of data to be transferred is specified in the first 16-bit field QWC. The operation code of this meta-instruction occupies a field from the 24th bit to the 31st bit. A field from the 32nd bit to the 63rd bit is used for specifying an address which this data to be transferred is stored at or a meta-instruction is to be read out next from.

The transfer of data is controlled in accordance with the operation code of a meta-instruction embedded in the data as follows.

If the operation code is "cnt", after as many words of data as specified by the QWC field following this meta-instruction have been transferred, a meta-instruction stored at an address following this packet (that is, the meta-instruction and the data) is executed by the processor. If the operation code is "cnts", after as many words of data as specified by the QWC field following this meta-instruction have been transferred by executing stall control, a meta-instruction stored at an address following this packet is executed by the processor. If the operation code is "next", after as many words of data as specified by the QWC field following this meta-instruction have been transferred, a meta-instruction stored at an address specified in the address field is executed by the processor.

The stall control is timing control carried out by a processor itself to put an access made by the processor to the main memory 45 in a wait state till an access to the main memory 45 made by another processor is completed.

If the operation code is "REF", after as many words of data as specified by the QWC field stored at an address ADDR specified in the address field have been transferred, a meta-instruction stored at an address following this meta-instruction is executed by the processor. If the operation code is "refs", after as many words of data as specified by the QWC field stored at an address ADDR specified in the address field have been transferred by executing stall control, a meta-instruction stored at an address following this meta-instruction is executed by the processor. As described above, a "REF" meta-instruction is used for transferring data with a length specified in the QWC field from an address specified in the address field.

If the operation code is "call", after as many words of data as specified by the QWC field following this meta-instruction have been transferred, an address following this packet is pushed (or loaded) into a register as a return address and a meta-instruction stored at an address specified in the address field of the meta-instruction is executed by the processor. If the operation code is "ret", after as many words of data as specified by the QWC field following this meta-instruction have been transferred, a meta-instruction stored at an address popped (or read out) back from the register is executed by the processor. It should be noted that the address has been pushed to the register as a return address during execution of a meta-instruction with the "CALL" operation code associated with this "RET" meta-instruction. If the operation code is "end", after as many words of data as specified by the QWC field following this meta-instruction have been transferred, the processing is ended.

Figure 10:
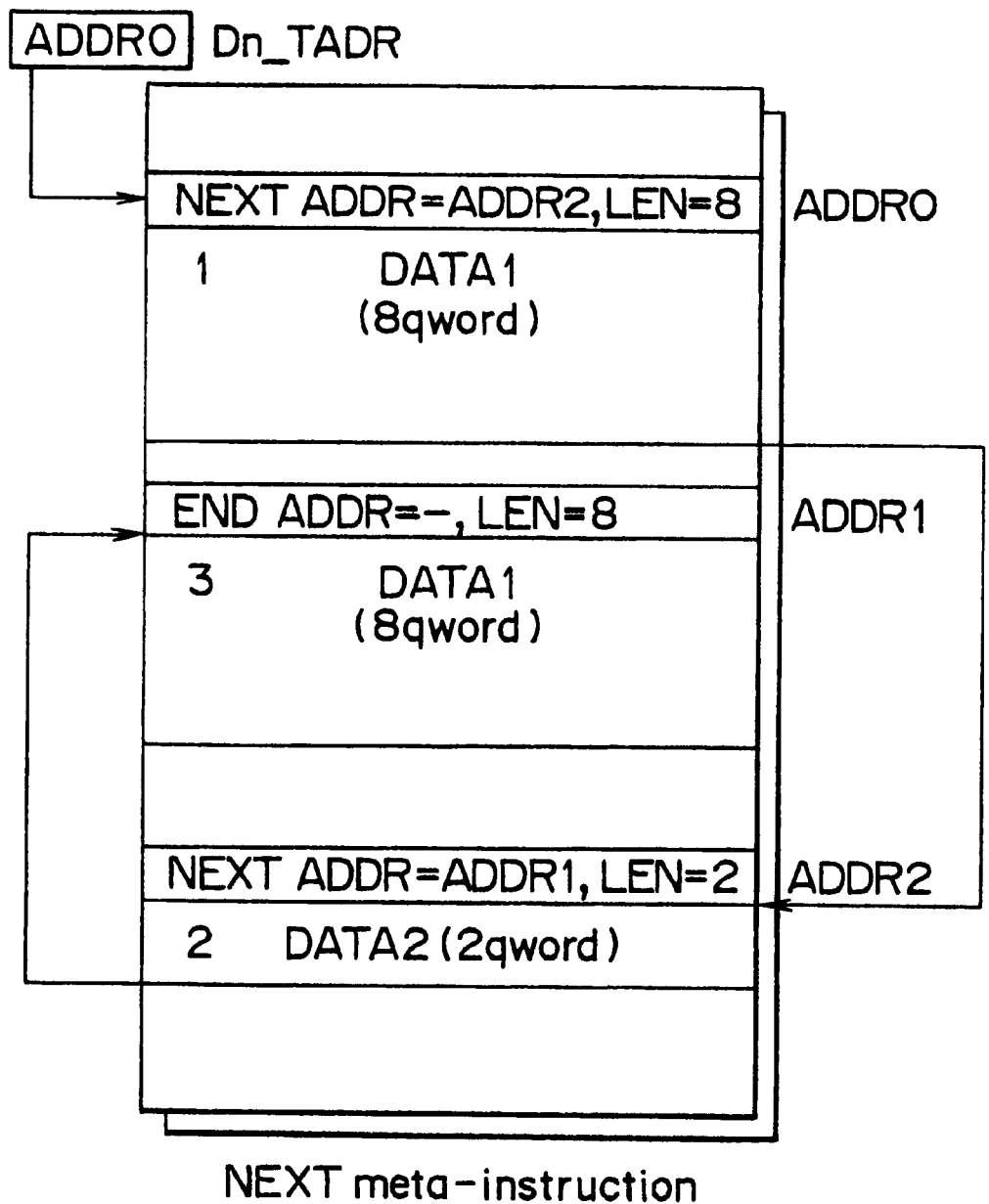
FIG. 10 is a diagram used for explaining a procedure for transferring data in accordance with meta-instructions.

FIG. 10 is a diagram used for explaining operations which are carried out by the processor when the operation code of meta-instructions is "next" which means that the next data following this meta-instruction is to be transferred. First of all, the main DMAC 46 reads out a 1 word as a meta-instruction word from an address ADDR0 stored in a Tag Address register Dn_TADR. Assume that the meta-instruction is "NEXT, ADDR=ADDR2, LEN=8" which means that the operation code is "next", the QWC field specifies that the length of the data to be transferred is 8 qwords (quadlet words) where 1 qword is 128 bits and ADDR2 is an address specified in the address field. Thus, in the execution of the meta-instruction "NEXT, ADDR=ADDR2, LEN=8", 8-qword data is transferred. Then, a meta-instruction "NEXT, ADDR=ADDR1, LEN=2" stored at the address ADDR2 is executed.

By the same token, in the execution of the meta-instruction "NEXT, ADDR=ADDR1, LEN=2", 2-qword data is transferred under control executed by the main DMAC 46. Then, a meta-instruction "END, ADDR=-, LEN=8" stored at an address ADDR1 is executed. In the execution of the meta-instruction "END, ADDR=-, LEN= 8", 8-qword data is transferred. Then, the processing is ended.

Figure 11:
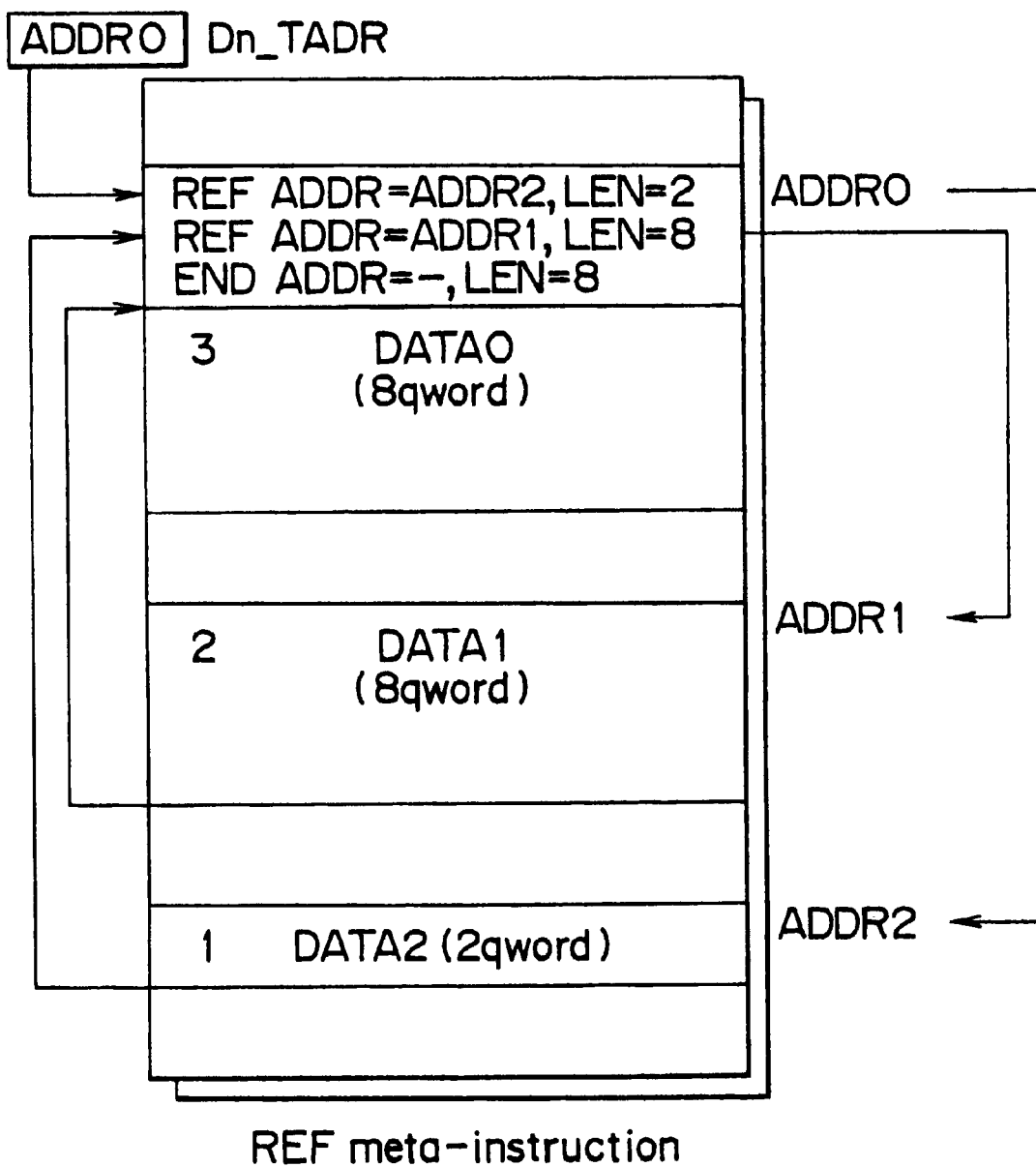
FIG. 11 is a diagram used for explaining another procedure for transferring data in accordance with meta-instructions.

FIG. 11 is a diagram used for explaining operations which are carried out by the processor when the operation code of meta-instructions is "REF". First of all, the main DMAC 46 reads out a 1 word as a meta-instruction word from an address ADDR0 stored in the tag address register Dn_TADR. Assume that the meta-instruction is "REF, ADDR=ADDR2, LEN2". In the execution of the meta-instruction "REF, ADDR=ADDR2, LEN=2", 2-qword data stored at an address ADDR2 is transferred. Then, a meta-instruction "REF, ADDR=ADDR1, LEN=8" following this meta-instruction is executed.

In the execution of the meta-instruction "REF, ADDR=ADDR1, LEN=8", 8-qword data stored at an address ADDR1 is transferred. Then, a meta-instruction "END, ADDR=-, LEN=8" following this meta-instruction is executed. In the execution of the meta-instruction "END, ADDR=-, LEN=8", 8-qword data is transferred. Then, the processing is ended.

Figure 12:
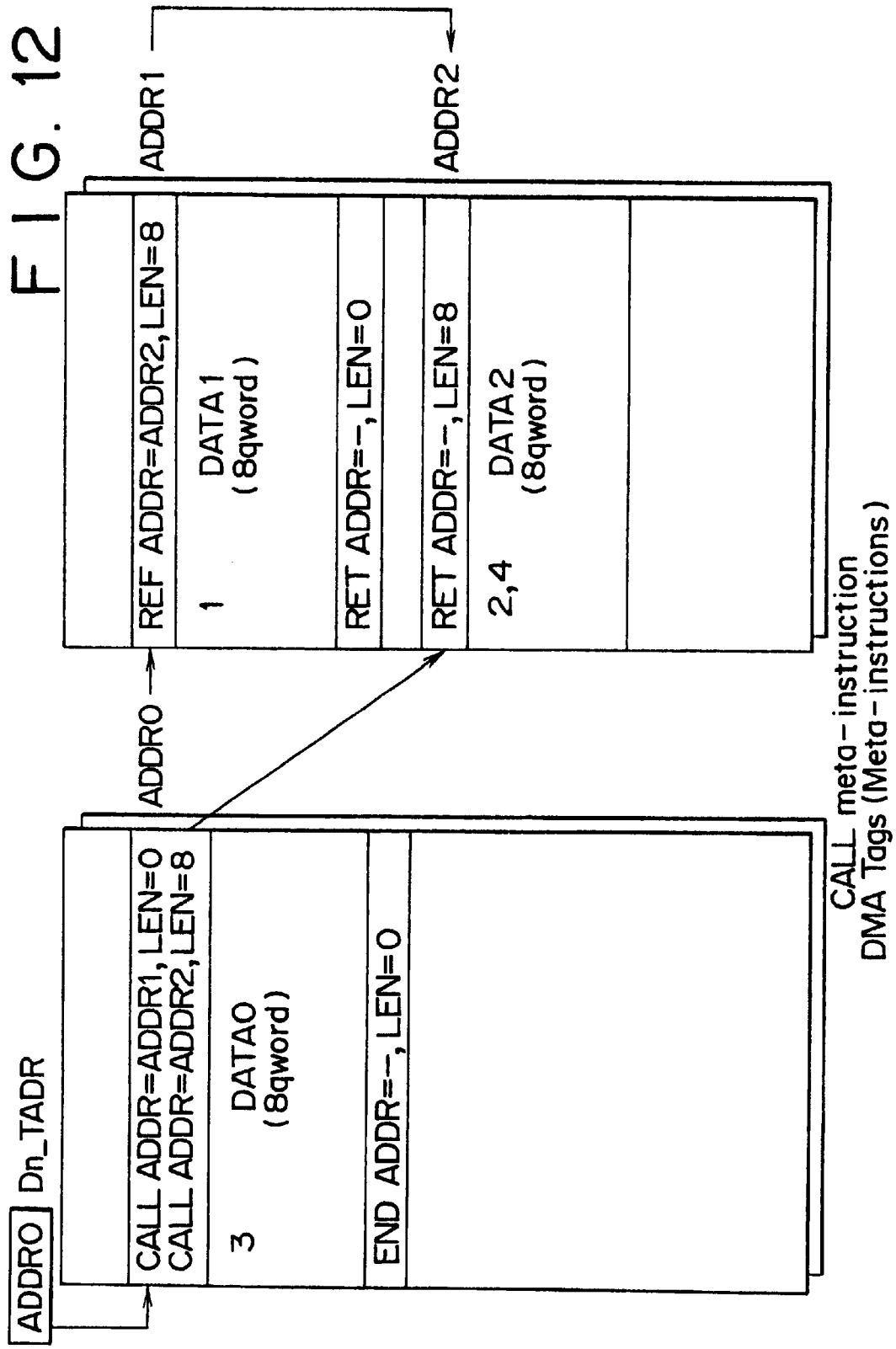
FIG. 12 is a diagram used for explaining a still further procedure for transferring data in accordance with meta-instructions.

FIG. 12 is a diagram used for explaining operations which are carried out by the processor when the operation codes of meta-instructions are "CALL" and "RET". First of all, the main DMAC 46 reads out a 1 word as a meta-instruction word from an address ADDR0 stored in the tag address register Dn_TADR. Assume that the meta-instruction is "CALL, ADDR=ADDR1, LEN=0". (In the execution of the meta-instruction "CALL, ADDR=ADDR1, LEN=0", no data following this meta-instruction is transferred because LEN=0. The address of a meta-instruction "CALL, ADDR=ADDR2, LEN=8" following this meta-instruction is pushed into a first register as a return address.) After the execution of the meta-instruction "CALL, ADDR=ADDR1, LEN=0", a meta-instruction "CALL, ADDR=ADDR2, LEN=8" shown on the right side of FIG. 12 and stored at an address ADDR1 is executed. In the execution of the meta-instruction "CALL, ADDR=ADDR2, LEN=8", 8-qword data following this meta-instruction is transferred, (pushing the address of a meta-instruction "RET, ADDR=-, LEN=0" following this packet into a second register as a return address.). Then, a meta-instruction "RET, ADDR=-, LEN=8" stored at an address ADDR2 is executed.

In the execution of the meta-instruction "RET, ADDR=-, LEN=8", 8-qword data following this meta-instruction is transferred. Then, the meta-instruction "RET, ADDR=-, LEN=0", the address of which was pushed in the second register in the execution of the meta-instruction "CALL, ADDR=ADDR2, LEN=8" shown on the right side, is executed. In the execution of the meta-instruction "RET, ADDR=-, LEN=0", no data following this meta-instruction is transferred because LEN=0. Then, the meta-instruction "CALL, ADDR=ADDR2, LEN=8" on the left side, the address of which was pushed in first the register in the execution of the meta-instruction "CALL, ADDR=ADDR1, LEN=0", is executed. In the execution of the meta-instruction "CALL, ADDR=ADDR2, LEN=8" on the left side, 8-qword data following this meta-instruction is transferred, (pushing the address of a meta-instruction "END, ADDR=-, LEN=0" following this packet into the first register as a return address.). Then, the meta-instruction "RET, ADDR=-, LEN=8" stored at ADDR2 is executed.

In the execution of the meta-instruction "RET, ADDR=-, LEN=8", 8-qword the data following this meta-instruction is transferred. Then, the meta-instruction "END, ADDR=-, LEN=0", the address of which was pushed in the first register in the execution of the meta-instruction "CALL, ADDR=ADDR2, LEN=8" on the left side, is executed. In the execution of the meta-instruction "END, ADDR=-, LEN=0", no data is transferred because LEN=0. Then, the processing is ended.

As described above, a transfer of data is controlled in accordance with a meta-instruction embedded in the data.

Figure 13:
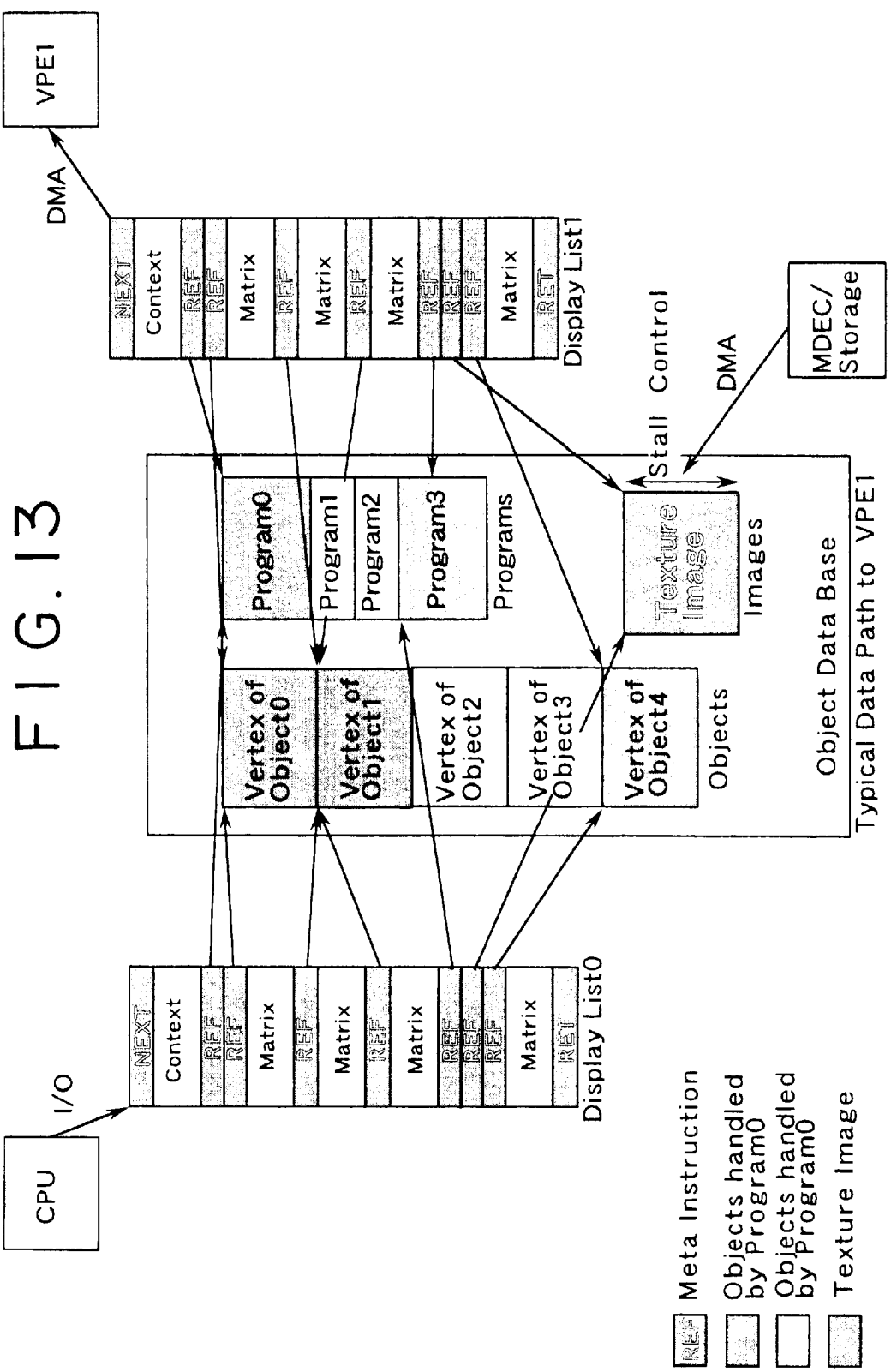
FIG. 13 is a diagram used for explaining a procedure for transferring data in accordance with a display list.

FIG. 13 is a diagram showing a state in which a transfer of data is controlled in accordance with a meta-instruction embedded in the data. While the main CPU 44 is making a display list (Display List #0), data associated with a display list (Display List #1) preceding Display List #0 by 1 frame is transferred to the second vector processing engine (VPE1) 48.

First of all, the main CPU 44 in a conjunction with the first vector processing engine 71 makes a display list (Display List #0) comprising a meta-instruction with the "NEXT" operation code, a context, a meta-instruction with the "REF" operation code, a meta-instruction with the "REF" operation code, a matrix, a meta-instruction with the "REF" operation code, a matrix, a meta-instruction with the "REF" operation code, a matrix, a meta-instruction with the "REF" operation code, a meta-instruction with the "REF" operation code, a meta-instruction with the "REF" operation code, a matrix and a meta-instruction with the "RET" operation code as shown in FIG. 13.

As described above, while the main CPU 44 is making a display list (Display List #0) in conjunction with the first vector processing engine 71, data associated with a display list (Display List #1) preceding Display List #0 by 1 frame is transferred to the second vector processing engine (VPE1) 48 as follows. First of all, a meta-instruction with the "NEXT" operation code at the head of Display List #1 is executed to transfer the subsequent context to the second vector processing engine 48. Then, a first meta-instruction with the "REF" operation code following the transferred context is executed to read out Program 0 stored in an object data base in the main memory 45 (and then transfer the program to the second vector processing engine 48). For example, a vertex data set, that is, the contents of an object shown in FIG. 13 can be stored somewhere and only matrixes of a display list are updated. It is thus possible to generate an image based on the observer's eyes. In this way, data with the contents thereof do not vary from frame to frame such as a program is read out from a display list by using a meta-instruction (to transfer the data to the second vector processing engine 48 without the need to include the data on the display list). Fixed data such as characters and constant data between them can be shared by meta-instructions in different display lists. As a result, a display list can be made by updating only positional data (that is, matrices) included on the display list with ease, the contents of which vary from frame to frame, of an existing display list made previously.

It should be noted that the object data base includes 3-dimensional data for describing a 3-dimensional object (also referred to hereafter as vertex of object) and a program for interpreting the object data. In addition, if texture mapping is carried out on an ornament of an object, image data used as a texture (referred to as a texture image) is also stored in the object data base.

Then, a second meta-instruction with the "REF" operation code following the above first "REF" meta-intruction is executed to read out 3-dimensional coordinate data Vertex of Object 0, that is, vertex coordinates of Object 0 (and then transfer the vertex coordinates of Object 0 to the second vector processing engine 48). Then, a first matrix is transferred to the second vector processing engine 48 (by execution of a meta-instruction with the NEXT operation code following the second "REF" meta-instruction at the head of the first matrix). Subsequently, a third meta-instruction with the "REF" operation code following the transferred first matrix is executed to read out 3-dimensional coordinate data Vertex of Object 1, that is, vertex coordinates of Object 1 (and then transfer the vertex coordinates of Object 1 to the second vector processing engine 48).

Then, a second matrix following the above third "REF" meta-instruction is transferred to the second vector processing engine 48 by execution of a meta-instruction with the NEXT operation code following the third "RFF" meta-instruction at the head of the second matrix. Subsequently, a fourth meta-instruction with the "REF" operation code following the transferred second matrix is executed to again read out the 3-dimensional coordinate data Vertex of Object 1, that is, vertex coordinates of Object 1 (and then transfer the vertex coordinates of Object 1 to the second vector processing engine 48). Then, a third matrix is transferred to the second vector processing engine 48 by execution of a meta-instruction with the NEXT operation code following the fourth "RFF" meta-instruction at the head of the third matrix. Subsequently, a fifth meta-instruction with the "REF" operation code following the transferred third matrix is executed to read out Program 3 (and then transfer the program to the second vector processing engine 48). Then, a sixth meta-instruction with the "REF" operation code following the above fifth "REF" instruction is executed to read out texture image data from the frame memory 58 and transfer the data to the second vector processing engine 48.

If the texture image data is not stored in the frame memory 58 yet, the texture image data is transferred to the frame memory 58 before object data Vertex of Object 4, is transferred by the following seventh meta-instruction with the "REF" operation code. If the texture image data is thawing data coming from the MDEC 47 or transferred data coming from the sub-bus 42, the texture image data varies from frame to frame. In this case, a stall function is used to establish synchronization of the data transfer as will be described later.

While image data is being transferred to the second vector processing engine 48, processing carried out by the second vector processing engine 48 is suspended temporarily. It is thus necessary to minimize the transfer period of image data by halting activities performed by other DMA channels during this period. Halting of activities carried out by other DMA channels can be specified by a predetermined control bit in a meta-instruction that is used for transferring image data. For example, the 24th and 25th bits of a meta-instruction shown in FIG. 9 are used as such control bits.

Then, the last (seventh) meta-instruction with the "REF" operation code is executed to read out 3-dimenisonal coordinate data Vertex of Object 4 (and then transfer the data to the second vector processing engine 48). Then, the last (fourth) matrix is transferred to the second vector processing engine 48 (by execution of a meta-instruction with the NEXT operation code following the seventh "RFF" meta-instruction at the head of the fourth matrix). Finally, a meta-instruction with the "RET" operation code is executed to end the transfer processing.

Figure 14:
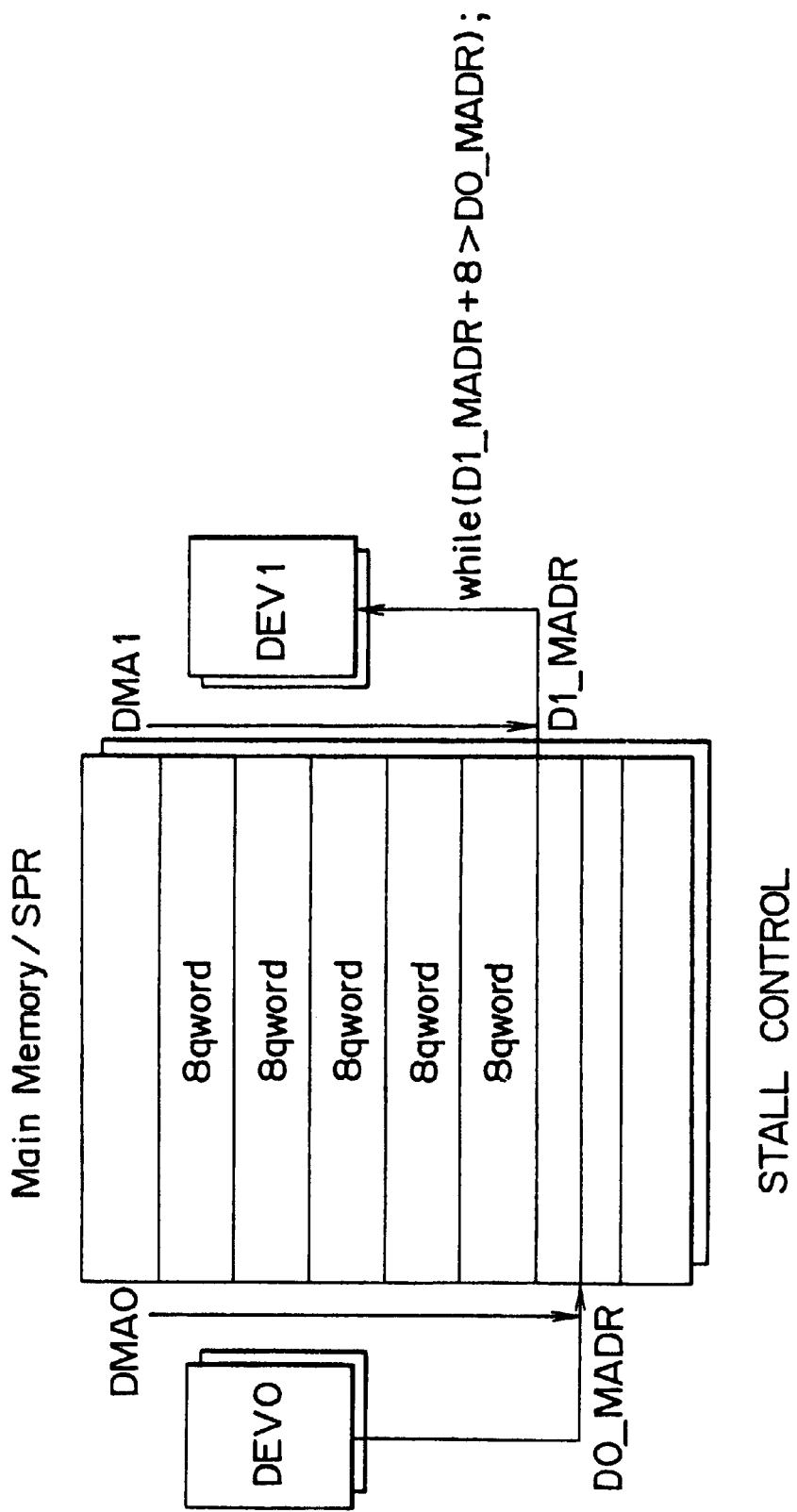
FIG. 14 is a diagram used for explaining stall control.

FIG. 14 is a diagram used for explaining the stall control cited above. Assume that data is transferred from Device 0 to a main memory and then from the main memory to Device 1 in an increasing order of data storage addresses in the main memory. In this case, an address in the main memory from which data is to be transferred to Device 1 may at one time exceed an address in the main memory to which data has been transferred from Device 0 least recently for some reasons. During such a time, the transfer of the data from the main memory to Device 1 is put in stalled state.

In the example of data transfers shown in FIG. 13, texture image data is transferred from a storage memory in the MDEC 47 to the main memory 45 and then from the main memory to the second vector processing engine 48 in an increasing order of data storage addresses in the main memory 45. In this case, an address in the main memory 45 from which data is to be transferred to the second vector processing engine 48 may at one time exceed an address in the main memory 45 to which data has been transferred from the storage memory in the MDEC 47 least recently for some reasons. During such a time, the transfer of the texture image data from the main memory 45 to the second vector processing engine 48 is put in a stalled state to establish transfer synchronization.

As described above, the main DMAC 46 fetches a meta-instruction from a display list and executes the meta-instruction in order to distribute data to processors. As a result, by programming the order and the form or the priority of transferring data in the data at the time a display list is created by the processor in advance, the data can be transferred in an optimum way in dependence on characteristics of the data. In addition, by having the processor prescribe the order of transferring data in the form of a list such as a display list in advance, it is not necessary for the processor to hold wasteful copied data for the transfer work in a memory. As a result, the number of wasteful accesses to the memory and the size of the display list is reduced.

Moreover, it is necessary to store only each of data portions to be transferred that vary from frame to frame separately at 2 locations for individual display lists. Any portion of display lists that does not vary from frame to frame can be stored in a memory area common to all the display lists. Thus, the size of a memory required for storing display lists can be reduced. That is to say, a number of display lists can be stored in a memory with a small storage capacity.

On the top of that, since data is transferred in accordance with a meta-instruction embedded in the data, synchronization of operations to read out and write data can be established among a plurality of processors with ease. As a result, a plurality of processors are allowed to share a memory without the need to provide a double buffer in the memory.

In the case of the embodiment described above, data is stored in a CD-ROM. It should be noted, however, that other recording media can also be used as well.

With the information processing apparatus according to claim 1 and the information processing method according to claim 4, when a first generation means is in the course of processing and an execution means is in a wait state, a second transfer means supplies a second instruction, if any, to the execution means and, receiving the second instruction, the execution means executes the second instruction.

What is claimed is:

1. An information processing apparatus comprising:
   a first generation means for carrying out processing to generate a first instruction;
   a second generation means for carrying out processing to generate a second instruction;
   a storage means for storing said second instruction generated by said second generation means;
   an execution means for executing said first and second instructions by said switching from said first instruction to said second instruction and vice versa with predetermined timing;
   a first transfer means for transferring said first instruction to said execution means; and
   a second transfer means for transferring said second instruction to said execution means,
   wherein, when said first generation means is in the course of processing to generate said first instruction and said execution means is in a wait state, said second transfer means supplies said second instruction stored in said storage means, if any, to said execution means, and said execution means executes said second instruction upon receipt of said second instruction.

2. An information processing apparatus according to claim 1 wherein:

said execution means holds as many parameters for execution of said first and second instructions as said first and second generation means; and when said first instruction is received from said first generation means, said execution means executes said first instruction by using a parameter associated with said first generation means supplying said first instruction and when said second instruction is received from said second generation means, said execution means executes said second instruction by using a parameter associated with said second generation means supplying said second instruction.

3. An information processing apparatus according to claim 1 wherein:

said first instruction is generated for type processing while said second instruction is generated for non-type processing.

4. An information processing method to be adopted in an information processing apparatus comprising the steps of:

generating a first instruction using a first generation means;

generating a second instruction using a second generation means;

storing, in a storage means, said second instruction generated by said second generation means;

executing, by an execution means, said first and second instructions by switching from said first instruction to said second instruction and vice versa with predetermined timing;

transferring said first instruction to said execution means using a first transfer means; and transferring said second instruction to said execution means, using a second transfer means;

whereby, when said first generation means is in the course of processing to generate said first instruction and said execution means is in a wait state, said second transfer means supplies said second instruction stored in said storage means, if any, to said execution means, and said execution means executes said second instruction upon receipt of said second instruction.

* * * * *